United States Patent [19]

Varadi et al.

[11] 4,293,808

[45] Oct. 6, 1981

[54] BATTERY CHARGING DEVICE EMPLOYING SOLAR CELLS

[75] Inventors: Peter F. Varadi; Ramon Dominguez, both of Rockville, Md.

[73] Assignee: Solarex Corporation, Rockville, Md.

[21] Appl. No.: 896,451

[22] Filed: Apr. 14, 1978

[51] Int. Cl.³ .............................................. H02J 7/00
[52] U.S. Cl. ....................................... 320/2; 320/61; 136/251; 136/291
[58] Field of Search ................................. 320/2, 3, 61

[56] References Cited

U.S. PATENT DOCUMENTS 3,344,334 9/1967 Rubin ..................................... 320/2
3,921,049 11/1975 Mellors et al. ........................ 320/2
3,947,743 3/1976 Mabuchi et al. ..................... 320/3 X Primary Examiner—Robert J. Hickey
Attorney, Agent, or Firm—Watson, Cole, Grindle & Watson

[57] ABSTRACT

A device utilizing solar energy cells to charge a battery or a plurality of batteries. An array of solar cells is disposed on a container having lid and tray parts. The parts are electrically interconnected to the solar cell array so that in container closed position the circuit including the solar cell array and the battery is closed to effect charging of the battery, and in container open position the circuit including the solar cell array and the battery is open with no flow of solar cell electrical output to the battery.

15 Claims, 3 Drawing Figures

BATTERY CHARGING DEVICE EMPLOYING SOLAR CELLS

BACKGROUND OF THE INVENTION

This invention relates generally to the utilization of solar energy cell technology as a source of electrical energy to charge batteries, and more specifically to charge batteries that are used in powering small electrical appliances, such as hearing aids, pocket calculators and the like.

The invention is most particularly concerned with a self-contained device having a solar cell power source that is capable of supplying electrical energy to recharge batteries placed within the container. The device is capable of supplying regulated, i.e., substantially constant-voltage electrical current for recharging the batteries by simply closing the container and placing the solar cell array disposed on the container in a location where it will receive incident light energy from either an artificial or natural light source.

Conventional battery recharging techniques utilize electrical energy from line voltage to supply a regulated supply of constant-voltage electrical current to the battery. Conventional line current sources require a transformer and a rectifying electronic circuit to convert to a constant-voltage electrical current and are inherently limited by requiring access to line current electrical sources. This presents a problem of incorporating a cumbersome and expensive circuit into a self-contained recharging unit and delimits the utility of any such unit to accessability to line current sources. Particularly with portable units utilized by travelers, such as those who have hearing aids, different countries have different plugs and different line voltages, such as to render inoperative conventional recharging apparatus designed for United States outlets and voltages.

Accordingly, it is the primary object of the present invention to provide a battery charging device in which the sole power source for recharging the battery or batteries is comprised of one or more solar energy cells, the device thereby being capable of supplying electrical energy to recharge the subject batteries for indefinite periods of time without recourse to any other source for electrical energy input.

It is a further object of the present invention to provide a battery charging device employing solar cells that supply a constant-voltage electrical current to the battery under varying lighting conditions.

It is a further object of the invention to provide a means to prevent discharging of a battery in the device when the container is in circuit open or circuit closed position.

Briefly, the invention in its broad aspect comprises a container having parts movable between open and closed positions, and an array of solar cells disposed on one of its surfaces. One part of the container is formed with a portion to receive at least one battery in a position in which it will be electrically connected—or disconnected to the solar array located in the other container part. The two container parts cooperate such that in container closed position an electrical circuit including the battery and the array is closed to charge the battery, and in container open position the electrical circuit including the solar cell array and the battery is broken.

More specifically, the parts of the container are a lid, in which the solar array can be mounted, and a tray that includes one or more battery receiving portions. As variants, closing the lid on which the solar array is mounted will make two contacts between the battery and the array to close the circuit, or one connection between the battery and the array is normally effected so that only a single contact need be made on closing of the lid.

Further objects, advantages, and features of the invention will be apparent in the arrangement and construction of the constituent parts of a specific embodiment of the best mode of the device as set forth in the following specification, taken together with the accompanying drawing.

DETAILED DESCRIPTION OF A PREFERRED EMBODIMENT

Figure 1:
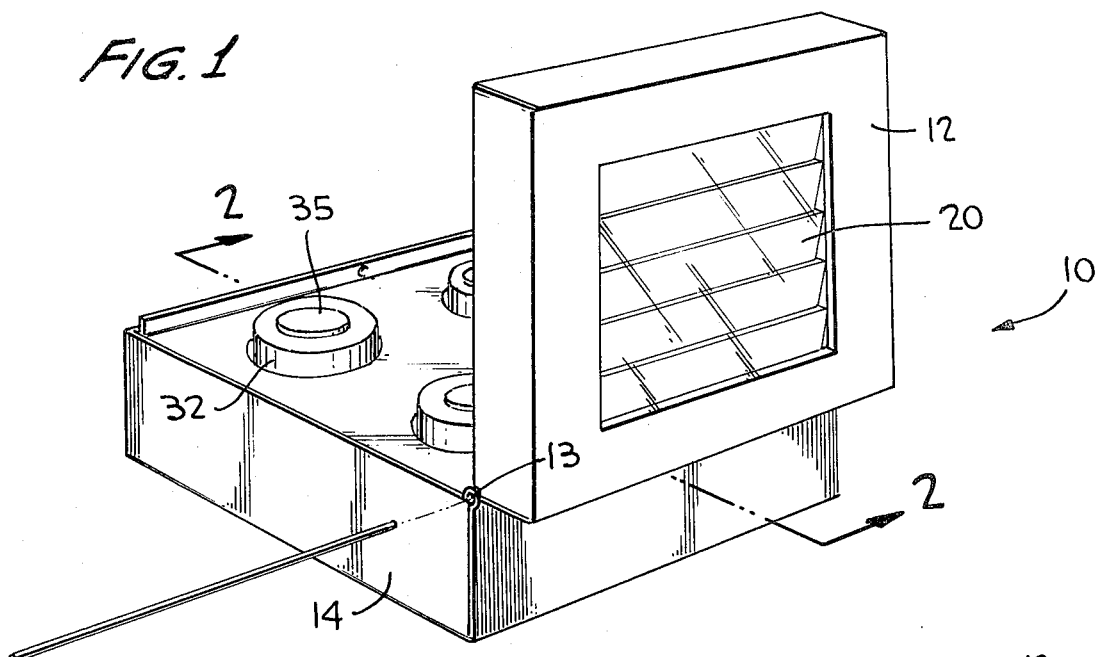
FIG. 1 is a perspective view of a battery charging device according to our invention.

Referring now to the drawing, and particularly to FIG. 1 thereof, the container according to our invention is generally indicated by arrow 10. Container 10 is formed with a tray 14 having a lid 12 mounted thereon in a conventional manner by means of a hinge 13. The container may be made of metal, plastic or any material suitable to give it sufficient structural integrity.

Figure 2:
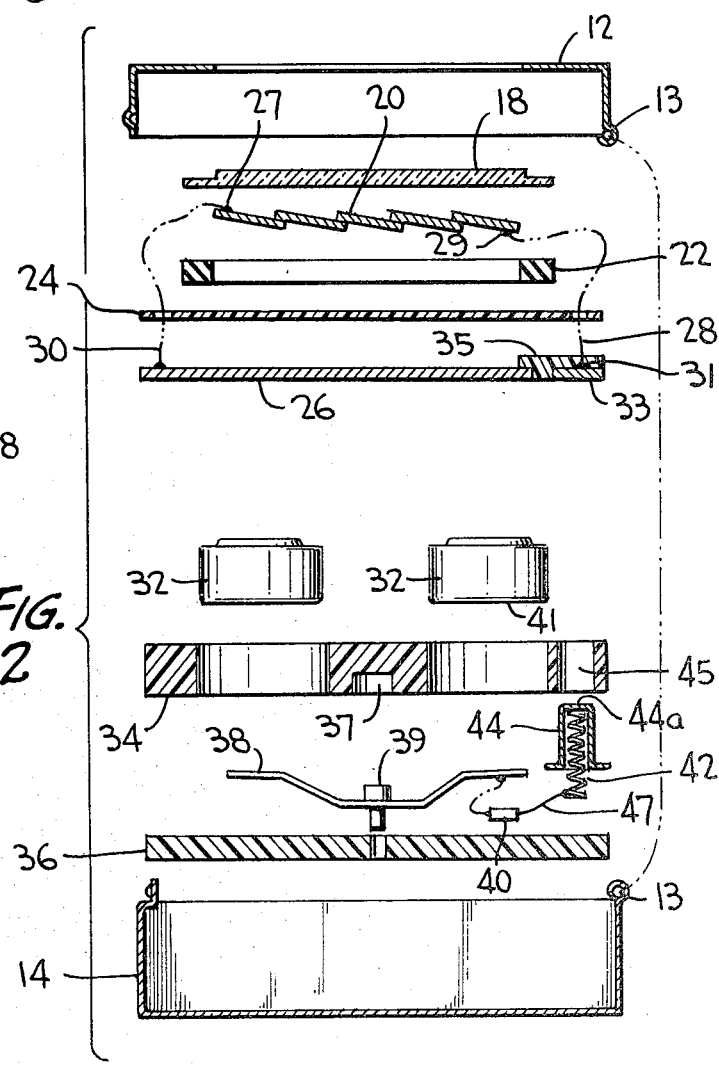
FIG. 2 is an exploded, sectional view of the battery charging device of FIG. 1 taken along the line 2—2 and extending through the entirety of the device.

Fixed in place on the upper surface of the lid 12 is a solar cell array indicated at 20. While the solar cell array 20 may be placed on the tray 14, it can easily be exposed to ambient light by being mounted on the lid 12. If higher current flow is desired, the surface area of the array may be increased. The solar cell array and its placement within lid 12 are illustrated in FIG. 2. The solar cell array 20 is retained on mat 22, which may be a thin plastic mat, which can insulate the cell array from the box if the box is made of metal, or other conventional means used for placement of solar cells. A transparent window 18, which may be glass or a silicone rubber encapsulant, protects the solar cell array 20 from ambient conditions. Wire 30 serves to electrically connect negative terminal 27 of the solar cell array to contact plate 26. As also seen in FIG. 2, positive solar cell array terminal 29 is connected to contact 31 by wire 28. Contact 31 is positioned on conductor portion 33, which is separated from contact plate 26 by a plug 35, which acts to insulate the conductor 33 from the contact plate 26.

It will be noted that the solar cells are presented in shingled or overlap array. This form of display is preferred to increase the voltage output of the solar cell array for a given available array surface area. This is in accord with the established principle that the greater the number of individual solar cells in the array the higher the voltage output of the array. It will be appreciated, however, that an edge-to-edge or unitary solar cell array may also be utilized. It is also possible to utilize a solar array where the individual cells are formed on a single silicon slab and the cells are connected with each other to provide the proper voltage.

The tray 14 functions to receive and position the batteries 32 to be charged. Batteries 32 may be made from silver oxide, nickel-cadmium, lithium or other types of conventional batteries used in small electrical appliances, e.g., hearing aids, which are capable of being recharged. As shown in FIG. 2 the batteries 32 are positioned so that their bottom terminals 41 rest on electrical contact spring 38, each battery being properly seated by means of positioning plate 34. The electrical contact spring 38 is fixedly attached to an insulator plate 36 by rivet 39 or other conventional means. Plates 34 and 36 may be made of bakelite or like insulating material. It will be appreciated that the bottom portion of positioning plate 34 may have a recess 37 such that plate 34 is not in physical contact with the contact spring 38 or connecting rivet 39, if positioning plate 34 is electrically conductive.

Now referring to the electrical connections of FIG. 2 in detail, electrical contact spring 38 is connected to diode 40 and by means of wire 47 to electrically conductive spring 42, which in turn is seated within the interior of a contact plug 44. Contact plug 44 is positioned in a recess in positioning plate 34 and in that recess functions as a contact interface through its exposed surface 44a. The contact interface 44a of plug 44 cooperates with conductor 33 in lid 12 to complete the electrical circuit between the solar cell array 20 and the bottom terminal of battery 32 when lid 12 is in container closed position. Since the contact spring 42 serves to bias contact plug 44 against the surface of conductor portion 33, when lid 12 is in the container closed position, such electrical contact is readily maintained. The contact spring 38 likewise biases the batteries 32 in the direction of the lid 12, whereby the upper terminals 35 of the batteries are forced into contact with lid contact plate 26. Additionally, an electrical connection is made between contact plug interface 44a and conductor portion 33. Since, as described, the conductor portion 33 and contact plate 26 are connected to opposite terminals of the solar cell array 20, closing the lid 12 completes a circuit including the batteries 32 and the solar cell array 20.

Figure 3:
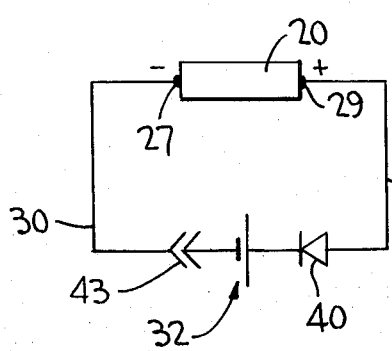
FIG. 3 is a block schematic diagram of an electrical circuit according to our invention.

A simplified schematic electrical circuit showing the completed circuit is illustrated in FIG. 3. While the electrical connections between the negative terminal 27 of solar cell array 20 and the terminal 35 of battery 32 is simply referenced by numeral 30, it will be recognized that such number refers to a wire that is part of the circuit and other components thereof. The same is true for reference numeral 28, which is meant to include not only wire 28 in the lid 12, but the many electrical components that complete the circuit between the positive terminal of the array 20 and the blocking diode 40, and then the bottom terminal 41 of the battery 32.

In order to prevent overcharging of the batteries 32, voltage regulating means should be employed in the circuit or in the array cells, themselves. In the former case, solar cells of standard design are used and shunt or series type regulator circuitry can be utilized. However, it is preferred at present that selfregulating photovoltaic cells be employed. One example of such a cell is found in commonly assigned, copending U.S. Pat. No. 4,106,047, issued Aug. 8, 1978, on which Joseph Lindmayer is the patentee. The disclosure of that patent is expressly incorporated by reference therein, as is that of U.S. Pat. No. 4,137,095, issued Jan. 30, 1979 in the name of Joseph Lindmayer. These patents disclose self-regulating photovoltaic cells capable of maintaining a substantially constant voltage under variations in ambient light, as does U.S. application Ser. No. 784,909, filed Apr. 5, 1977 in the name of Joseph Lindmayer.

The container with its lid closed and one or more batteries in position is placed in a convenient location to allow either natural or artificial light to impinge on the solar cell array 20, whereupon the electrical output of the solar cell array is transmitted directly to the batteries 32. When the batteries have been charged sufficiently, or at any time desired during charging, the circuit may be broken simply by opening the lid 12. With the batteries thus exposed, one or all may be extracted for use and replaced, if desired, by worn batteries.

While the present invention has been illustrated and described with respect to preferred embodiment thereof, it will be obvious to those skilled in the art that various changes and modifications may be made in that embodiment without departing from the purview of the invention. For example, it is not requisite that upon closing the lid two electrical contacts simultaneously be made to complete a circuit including a battery and the solar cell array. Thus, the components between diode 40 and the positive terminal 29 of the array may be replaced by an electrical wire, so that a leg of the circuit between the battery and that terminal is always complete. In this modification, the circuit would be closed upon contact of an upper battery terminal 35 and the contact plate 26 only.

As to all such obvious modifications, it is desired that they be included within the range of our invention, which is to be limited only by the scope, including equivalents, of the following, appended claims.

We claim:

1. A device for charging a battery, comprising a container having parts movable between open and closed positions and having an array of solar cells disposed in light-receiving position thereon, said array having positive and negative electrical terminals, said container being formed with at least one part adapted to receive a battery therein, and the other of said parts including a first electrical contact connected to one of said array terminals and adapted to contact one terminal of said battery, a second electrical contact in said battery receiving part, the other terminal of said battery in said receiving portion being in contact with said second electrical contact, a third movable contact is electrically connected to said second electrical contact and adapted to be electrically connected to the other terminal of said solar array, and said third movable electrical contact moving into electrical connecting relationship with said other terminal of said solar cell array in a plane transverse to said first electrical contact and said first electrical contact contacting said one battery terminal to charge said battery when said movable parts are moved from an open to a closed position.

2. The device claimed in claim 1, in which said container parts include a lid and a tray and said solar cell array is disposed on said lid and said battery receiving portion is located in said tray.

3. The device claimed in claim 1, further comprising a blocking diode interconnecting said second electrical contact and said third movable electrical contact to inhibit discharge of said battery when said container is in said closed position.

4. The device claimed in claim 1, in which said solar cells are capable of maintaining a substantially constant voltage under variations in ambient light.

5. The device claimed in claim 1, further comprising means for regulating the charging voltage of said battery to inhibit overcharge thereof.

6. A device for charging a battery, comprising a container having a lid and a tray relatively movable between open and closed positions and having an array of solar cells disposed in light-receiving position on said lid, said array having positive and negative electrical terminals, said tray being formed with at least one portion adapted to receive a battery therein, each such battery receiving portion including an electrical contact arranged for electrical connection to one of said array terminals, another electrical contact in said lid electrically connected to the other terminal of said solar cell array, one terminal of said battery in said receiving portion being electrically connected to said an electrical contact and the other battery terminal being located for contact with said another electrical contact, the terminals of said battery being unconnected to said one and said other array terminals when said container is in open position and each terminal of said battery being connected to a respective one of said solar array terminals through said an electrical contact being electrically connected to said one array terminal and said another electrical contact contacting said other battery terminal to charge said battery when said lid and said tray are moved into said closed position.

7. The device claimed in claim 6, further comprising a blocking diode to inhibit discharge of said battery when said container is in said closed position.

8. The device claimed in claim 6, further comprising means for regulating the charging voltage to said battery to inhibit overcharge thereof.

9. A device as in claim 1 further comprising a conductor portion and together with said first electrical contact being respectively connected to said other and said one terminal of said solar cell array, and an insulating member separating said conductor portion and said first electrical contact, said third movable electrical contact contacting said conductor portion with said container in said closed position.

10. A device as in claim 9 further comprising an insulator plate member in said battery receiving part and having at least one aperture therein adapted to receive a battery and another aperture through which said third electrical contact is movable upon closure of said container into said closed position.

11. A device as in claim 10 further comprising means for biasing said third movable electrical contact into contacting relationship with said other terminal of said solar cell array with said container in said closed position.

12. A device as in claim 6 further comprising a contact spring in said battery receiving portion for supporting said battery and being electrically connected to said an electrical contact.

13. A device as in claim 6 further comprising a conductor portion and together with said another electrical contact being respectively connected to said one and said other terminal of said solar array, and an insulating member separating said conductor portion and said another electrical contact, said an electrical contact contacting said conductor portion with said container in said closed position.

14. A device as in claim 6 further comprising an insulator plate member in said battery receiving portion and having at least one aperture therein adapted to receive a battery and another aperture through which said an electrical contact is movable upon closure of said container into said closed position.

15. A device as in claim 14 further comprising means for biasing said an electrical contact into electrical connecting relationship with said one terminal of said solar cell array with said container in said closed position.

* * * * *